US005783513A

United States Patent [19]

Combs et al.

[11] Patent Number: 5,783,513
[45] Date of Patent: Jul. 21, 1998

[54] PROCESS FOR MAKING DOUBLE METAL CYANIDE CATALYSTS

[75] Inventors: George Combs, Downington, Pa.; Harry R. Hinney, Cross Lanes; Paul T. Bowman, Hurricane, both of W. Va.

[73] Assignee: ARCO Chemical Technology, L.P., Greenville, Del.

[21] Appl. No.: 816,611

[22] Filed: Mar. 13, 1997

[51] Int. Cl.⁶ ................................................. B01J 27/26
[52] U.S. Cl. ............................................. 502/175; 502/200
[58] Field of Search ...................................... 502/175, 200

[56] References Cited

U.S. PATENT DOCUMENTS

| | | |
|---|---|---|
| 3,427,256 | 2/1969 | Milgrom . |
| 3,829,505 | 8/1974 | Herold . |
| 4,477,589 | 10/1984 | van der Hulst et al. ............ 502/169 |
| 5,158,922 | 10/1992 | Hinney et al. ...................... 502/175 |
| 5,470,813 | 11/1995 | Le-Khac ............................... 502/175 |
| 5,482,908 | 1/1996 | Le-Khac ............................... 502/156 |
| 5,545,601 | 8/1996 | Le-Khac ............................... 502/156 |
| 5,627,122 | 5/1997 | Le-Khac et al. .................... 502/175 |

OTHER PUBLICATIONS

J.L. Schuchardt & S.D. Harper, "Preparation of High Molecular Weight Polyols Using Double Metal Cyanide Catalysts," *Proceeding of The SPI, 32nd Annual Polyurethane Tech./Market Conference,* Oct. 1–4, 1989.

*Primary Examiner*—Elizabeth D. Wood
*Attorney, Agent, or Firm*—Jonathan L. Schuchardt

[57] ABSTRACT

A process for making substantially non-crystalline double metal cyanide (DMC) catalysts having improved activity and performance is disclosed. The process comprises using a metal salt having an alkalinity within the range of about 0.2 to about 2.0 wt. % as metal oxide based on the amount of metal salt to prepare the catalyst. Surprisingly, important polyol properties such as viscosity and unsaturation improve when the alkalinity of the metal salt used to make the DMC catalyst is properly controlled. The process allows catalyst producers to enjoy the benefits of substantially non-crystalline DMC catalysts even when relatively inexpensive, technical-grade metal salts are used to make the catalyst.

21 Claims, No Drawings

5,783,513

1

PROCESS FOR MAKING DOUBLE METAL CYANIDE CATALYSTS

FIELD OF THE INVENTION

The invention relates to double metal cyanide (DMC) catalysts and processes for making them. In particular, the invention relates to a process for making improved substantially non-crystalline DMC catalysts by controlling the alkalinity of the metal salt used to make the catalyst.

BACKGROUND OF THE INVENTION

Double metal cyanide complexes are well-known catalysts for epoxide polymerization. These active catalysts give polyether polyols that have low unsaturation compared with similar polyols made using basic (KOH) catalysis. The catalysts can be used to make many polymer products, including polyether, polyester, and polyetherester polyols. These polyols are useful in polyurethane coatings, elastomers, sealants, foams, and adhesives.

DMC catalysts are usually made by reacting aqueous solutions of metal salts and metal cyanide salts to form a precipitate of the DMC compound. A low molecular weight organic complexing agent, typically an ether or an alcohol, is included in the catalyst preparation. The organic complexing agent is needed for favorable catalyst activity. Preparation of typical DMC catalysts is described, for example, in U.S. Pat. Nos. 3,427,256, 3,829,505, and 5,158,922.

For decades, DMC catalysts having a relatively high degree of crystallinity were used for making epoxide polymers. The most popular catalyst contained an organic complexing agent (usually glyme), water, excess metal salt (typically zinc chloride), and the DMC compound. Activity for epoxide polymerization, which exceeded the activity available from the commerical standard (KOH), was thought to be adequate. Later, it was appreciated that more active catalysts would be valuable for successful commercialization of polyols from DMC catalysts.

Recent improvements in DMC catalyst technology have provided catalysts with exceptional activity for epoxide polymerization. For example, U.S. Pat. No. 5,470,813 describes substantially amorphous or non-crystalline catalysts that have much higher activities compared with earlier DMC catalysts. Other highly active DMC catalysts include, in addition to a low molecular weight organic complexing agent, from about 5 to about 80 wt. % of a polyether such as a polyoxypropylene polyol (see U.S. Pat. Nos. 5,482,908 and 5,545,601). Even more recently, DMC catalysts that incorporate a functionalized polymer other than a polyether have been described (U.S. Pat. No. 5,714,428). Highly active DMC catalysts are generally substantially non-crystalline, as is evidenced by powder X-ray diffraction patterns that lack many sharp lines. The catalysts are active enough to allow their use at very low concentrations, often low enough to overcome any need to remove the catalyst from the polyol.

Even the best DMC catalysts known could be improved. Catalysts with increased activity remain desirable. In addition, catalysts that give polyol products with lower viscosities, reduced unsaturations, and less high-molecular-weight-polyol tail impurities are needed.

The art of DMC catalyst preparation is silent regarding the impact of metal salt alkalinity. The references suggest that any grade of metal salt or metal salt solution can be used regardless of whether the target is a conventional DMC catalyst (e.g., as in U.S. Pat. No. 5,158,922) or a newer, more-active, non-crystalline variety. In fact, however, metal salt alkalinity makes a difference, particularly when a substantially non-crystalline DMC catalyst is the goal. When relatively inexpensive, technical-grade metal salts (e.g., technical-grade zinc chloride) are used to make substantially non-crystalline DMC catalysts, activity often drops, and polyols made from the catalysts have relatively high viscosities, high unsaturation levels, and elevated high-molecular-weight-tail contents. As a result, some of the advantages of using a non-crystalline DMC catalyst diminish.

In sum, an improved process for making DMC catalysts is needed. Preferably, the process would give highly active, substantially non-crystalline DMC catalysts. Preferably, catalysts made by the process would give polyether polyols with low unsaturations and low viscosities. Ideally, the process would give catalysts that are active enough to use at very low concentrations, preferably at concentrations low enough to overcome any need to remove them from the polyol. Preferably, the process would allow catalyst makers to enjoy the benefits of substantially non-crystalline DMC catalysts even when inexpensive technical-grade metal salts are used to make the catalyst.

SUMMARY OF THE INVENTION

The invention is a process for making a substantially non-crystalline double metal cyanide catalyst. The process comprises reacting aqueous solutions of a metal salt and a metal cyanide salt in the presence of an organic complexing agent in a manner effective to produce the catalyst. The metal salt solution used in the process has an alkalinity within the range of about 0.2 to about 2.0 wt. % as metal oxide based on the amount of metal salt.

We surprisingly found that the alkalinity of the metal salt solution used makes a difference, particularly when a substantially non-crystalline DMC catalyst is prepared. While the DMC catalyst art is silent regarding any impact of metal salt alkalinity, we discovered that catalyst activity and important polyol properties such as viscosity and unsaturation improve when alkalinity of the metal salt solution is properly controlled. The process of the invention allows those interested in making highly active, substantially non-crystalline DMC catalysts to enjoy the full benefits that those catalysts offer, even when the catalyst is made with relatively inexpensive, technical-grade metal salts.

DETAILED DESCRIPTION OF THE INVENTION

In the process of the invention, aqueous solutions of a metal salt and a metal cyanide salt react in the presence of an organic complexing agent to produce a substantially non-crystalline double metal cyanide (DMC) catalyst.

The metal salt preferably is water soluble and has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel(II) nitrate, and the like, and mixtures thereof. Zinc chloride is most preferred.

The alkalinity of the metal salt used in the process is an important aspect of the invention. Controlling metal salt alkalinity is a key to improving catalyst activity and polyol physical properties. In the process of the invention, aqueous solutions of the metal salt have an alkalinity within the range of about 0.2 to about 2.0 wt. % as metal oxide based on the amount of metal salt. For example, if the metal salt used is zinc chloride (as is commonly used to make zinc hexacyanocobaltate), the alkalinity of aqueous zinc chloride used in the process is about 0.2 to about 2.0 wt. % as zinc oxide based on the amount of zinc chloride in the solution. A more preferred range for the metal salt is about 0.3 to about 1.0 wt. % as metal oxide; most preferred is the range from about 0.4 to about 0.9 wt. % as metal oxide.

Alkalinity of the metal salt often depends on the source of the metal salt. Technical-grade metal salts, e.g., technical-grade zinc chloride, are desirable for use, particularly in large-scale catalyst preparations, because they are relatively cheap. However, technical-grade metal salts often contain acidic impurities, and aqueous solutions of these salts can have extremely low alkalinities (less than 0.2 wt. % as metal oxide). For example, technical grade zinc chloride solutions typically have alkalinities within the range of about 0 to about 0.3 wt. % as zinc oxide. We found that when metal salts having relatively low alkalinity are used to make substantially non-crystalline DMC catalysts, the catalysts have reduced activity, and polyols made from the catalysts have less desirable physical properties.

When technical-grade metal salts are used in the process of the invention, we surprisingly found that it is usually necessary to add a base to the aqueous solution to adjust the alkalinity to a value within the range of about 0.2 to about 2.0 wt. % as metal oxide. Suitable bases are compounds that when added to pure water give a solution having a pH greater than 7.0. The base can be an inorganic base, such as a metal oxide, an alkali metal hydroxide, or an alkali metal carbonate, or an organic base, such as an amine. Example A below shows one way to measure alkalinity.

The metal cyanide salt preferably is water soluble and has the general formula $(Y)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(II), Ir(III), and Ni(II). The metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and the like. Alkali metal hexacyanocobaltates are most preferred.

Examples of double metal cyanide compounds that can be made by the process of the invention include, for example, zinc hexacyano-cobaltate(III), zinc hexacyanoferrate(III), zinc hexacyanoferrate(II), nickel(II) hexacyanoferrate(II), cobalt(II) hexacyanocobaltate(III), and the like. Further examples of suitable double metal cyanide compounds are listed in U.S. Pat. No. 5,158,922, the teachings of which are incorporated herein by reference. Zinc hexacyanocobaltate is most preferred.

DMC catalysts made by the process of the invention include an organic complexing agent. Generally, the complexing agent is relatively soluble in water. Suitable complexing agents are those commonly known in the art, as taught, for example, in U.S. Pat. No. 5,158,922. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitrites, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is most preferred.

Catalysts made by the process of the invention are substantially non-crystalline. By "substantially non-crystalline," we mean lacking a well-defined crystal structure, or characterized by the substantial absence of sharp lines in the powder X-ray diffraction pattern of the composition. Conventional zinc hexacyanocobaltate-glyme catalysts (such as those described in U.S. Pat. No. 5,158,922) show a powder X-ray diffraction pattern containing many sharp lines, which indicates that the catalyst has a high degree of crystallinity. Zinc hexacyanocobaltate prepared in the absence of a complexing agent is also highly crystalline (and is inactive for epoxide polymerization). In contrast, catalysts made by the process of the invention are substantially non-crystalline.

Processes for making several kinds of highly active, substantially non-crystalline DMC catalysts have been described. The process of the invention involves using a metal salt solution having an alkalinity within the range of about 0.2 to about 2.0 wt. % as metal oxide based on the amount of metal salt in one of these procedures to make a substantially non-crystalline DMC catalyst. For example, U.S. Pat. No. 5,470,813, the teachings of which are incorporated herein by reference, shows how to make substantially non-crystalline DMC compounds using t-butyl alcohol as the preferred complexing agent. In addition, U.S. Pat. Nos. 5,482,908 and 5,545,601 describe highly active, substantially non-crystalline DMC catalysts that include, in addition to a low molecular weight organic complexing agent, from about 5 to about 80 wt. % of a polyether such as a polyoxypropylene polyol.

DMC catalysts made by the process of the invention optionally include a functionalized polymer or its water-soluble salt. By "functionalized polymer" we mean a polymer that contains one or more functional groups containing oxygen, nitrogen, sulfur, phosphorus, or halogen, wherein the polymer, or a water-soluble salt derived from it, has relatively good water solubility, i.e., at least about 3 wt. % of the polymer or its salt dissolves at room temperature in water or mixtures of water with a water-miscible organic solvent. Examples of water-miscible organic solvents are tetrahydrofuran, acetone, acetonitrile, t-butyl alcohol, and the like. Water solubility is important for incorporating the functionalized polymer into the catalyst structure during formation and precipitation of the double metal cyanide compound.

Preferred functionalized polymers have the general structure:

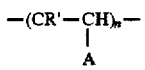

in which R' is hydrogen, —COOH, or a $C_1$—$C_5$ alkyl group, and A is one or more functional groups selected from the group consisting of —OH, —$NH_2$, —NHR, —$NR_2$, —SH, —SR, —COR, —CN, —C, —Br, —$C_6H_4$—OH, —$C_6H_4$—$C(CH_3)_2$OH, —$CONH_2$, —CONHR, —CO—$NR_2$, —OR, —$NO_2$, —NHCOR, —NRCOR, —COOH, —COOR, —CHO, —OCOR, —COO—R—OH, —$SO_3$H, —CONH—R—$SO_3$H, pyridinyl, and pyrrolidonyl, in which R is a $C_1$-$C_5$ alkyl or alkylene group, and n has a value within the range of about 5 to about 5,000. More preferably, n is within the range of about 10 to about 500.

Optionally, the functionalized polymer also includes recurring units derived from a non-functionalized vinyl monomer such as an olefin or diene, e.g., ethylene, propylene, butylenes, butadiene, isoprene, styrene, or the like, provided that the polymer or a salt derived from it has relatively good solubility in water or mixtures of water and a water-miscible organic solvent.

Suitable functionalized polymers include, for example, poly(acrylamide), poly(acrylamide-co-acrylic acid), poly (acrylic acid), poly(2-5 acrylamido-2-methyl-1-propanesulfonic acid), poly(acrylic acid-co-maleic acid), poly(acrylonitrile), poly(alkyl acrylate)s, poly(alkyl methacrylate)s, poly(vinyl methyl ether), poly(vinyl ethyl ether), poly(vinyl acetate), poly(vinyl alcohol), poly(N-vinylpyrrolidone), poly(N-vinylpyrrolidone-co-acrylic acid), poly(N,N-dimethylacrylamide), poly(vinyl methyl ketone), poly(4-vinylphenol), poly(4-vinylpyridine), poly (vinyl chloride), poly(acrylic acid-co-styrene), poly(vinyl sulfate), poly(vinyl sulfate) sodium salt, and the like.

Suitable functionalized polymers include polyethers. Catalysts that incorporate a polyether are taught in U.S. Pat. Nos. 5,482,908 and 5,545,601, the teachings of which are incorporated herein by reference. In one preferred process of the invention, the functionalized polymer is a polyether polyol.

In other preferred catalysts made by the process of the invention, the functionalized polymer is selected from the group consisting of polyesters, polycarbonates, oxazoline polymers, polyalkylenimines, maleic acid and maleic anhydride copolymers, hydroxyethyl cellulose, starches, and polyacetals. Thus, the functionalized polymer can be, for example, poly(ethylene glycol adipate), poly(dipropylene glycol adipate), poly(1,6-hexanediol carbonate), poly(2-ethyl-2-oxazoline), poly(vinyl butyral-co-vinyl alcohol-co-vinyl acetate), and the like, and salts thereof.

Catalysts made by the process of the invention optionally contain from about 2 to about 80 wt. % (based on the total amount of catalyst) of the functionalized polymer. Preferably, the catalysts contain from about 5 to about 70 wt. % of the polymer; most preferred is the range from about 10 to about 60 wt. %. At least about 2 wt. % of the polymer is needed to significantly improve the catalyst activity compared with a catalyst made in the absence of the polymer. Catalysts that contain more than about 80 wt. % of the polymer are generally no more active, and they are often difficult to isolate.

The molecular weight of the functionalized polymer can vary over a fairly wide range. Preferably, the number average molecular weight is within the range of about 300 to about 500,000; a more preferred range is from about 500 to about 50,000.

Substantially non-crystalline catalysts of the invention are preferably powders or pastes. Preferred paste catalysts of the invention comprise from about 10 to about 60 wt. % of a double metal cyanide compound, from about 40 to about 90 wt. % of an organic complexing agent, and from about 1 to about 20 wt. % of water. In preferred paste catalysts of the invention, at least about 90% of the catalyst particles have a particle size less than about 10 microns as measured by light scattering in polyether polyol dispersions of the catalyst particles. Paste catalysts and methods for making them are fully described in U.S. Pat. No. 5,639,705, now allowed, the teachings of which are incorporated herein by reference.

Catalysts made by the process of the invention have unique infrared spectra that result from the use of metal salts with relatively high alkalinity. The catalysts preferably have a unique peak in the range of about 640 to about 645 $cm^{-1}$ ("the 642 $cm^{-1}$ peak") having a normalized absorbance within the range of about 0.2 to about 2; a more preferred range for the normalized absorbance is from about 0.3 to about 0.8. By "normalized absorbance," we mean the measured absorbance normalized to correct for differences in the metal cyanide content of the catalyst samples. For a zinc hexacyano-cobaltate catalyst, this means correcting for different cobalt levels in catalyst samples. Generally, the intensity of the 642 $cm^{-1}$ peak increases as the alkalinity of the metal salt solution used to make the catalyst increases. Example B below explains how to measure absorbance of the 642 $cm^{-1}$ peak.

In a typical process for making the catalyst, an aqueous solution of the metal salt (e.g., zinc chloride) is first prepared. The alkalinity of the metal salt solution is adjusted to a value within the range of about 0.2 to about 2.0 wt. % as metal oxide based on the amount of metal salt using a base, if necessary. Next, the adjusted metal salt solution is combined and reacted with an aqueous solution of a metal cyanide salt (such as potassium hexacyanocobaltate) in the presence of an organic complexing agent (such as tert-butyl alcohol) using efficient mixing to produce a catalyst slurry. A functionalized polymer such as a polyether is optionally included. The metal salt is used in excess. The catalyst slurry contains the reaction product of the metal salt and metal cyanide salt, which is the double metal cyanide compound. Also present are excess metal salt, water, organic complexing agent, and any functionalized polymer; each is incorporated to some extent in the catalyst structure.

The reactants are combined at any desired temperature. Preferably, the catalyst is prepared at a temperature within the range of about room temperature to about 80° C.; a more preferred range is from about 35° C. to about 60° C.

The organic complexing agent and optional functionalized polymer can be included with either or both of the the aqueous salt solutions, or they can be added to the catalyst slurry immediately following precipitation of the DMC compound. It is generally preferred to pre-mix the complexing agent with either aqueous solution, or both, before combining the reactants. If the complexing agent is added to the catalyst precipitate instead, then the reaction mixture should be mixed efficiently with a homogenizer or a high-shear stirrer to produce the most active form of the catalyst. It is generally preferred to add functionalized polymer following precipitation of the DMC compound. The catalyst is then usually isolated from the catalyst slurry by any convenient means, such as filtration, centrifugation, decanting, or the like.

The isolated catalyst is preferably washed with an aqueous solution that contains additional organic complexing agent and/or additional functionalized polymer. After the catalyst has been washed, it is usually preferred to dry it under vacuum until the catalyst reaches a constant weight. Suitable techniques for washing and isolating the catalyst are described in U.S. Pat. No. 5,482,908.

The process of the invention offers substantial advantages. First, by controlling metal salt alkalinity, the process allows preparation of highly active, substantially non-crystalline DMC catalysts with even inexpensive technical-grade metal salts. We found that the extremely high activity of substantially non-crystalline varieties of DMC catalysts can be compromised if the alkalinity of the metal salt solution used is not controlled. By adjusting the alkalinity within the range of about 0.2 to about 2.0 wt. % as metal oxide, high catalyst activity can be maintained even if cheap metal salt sources are required. Because high activity is maintained, catalysts from the process of the invention are useful even at very low concentrations, often low enough to overcome any need to remove them from the polyol.

Second, polyols made from the catalyst improve when the process of the invention is used to make the catalyst. Compared with polyols made from metal salts that have alkalinities outside the claimed range, those of the invention have lower viscosities, narrower molecular weight distributions, lower unsaturations, and reduced levels of high molecular weight polyol tail. Low viscosity and narrow molecular weight distribution aid in processing polyurethanes by prepolymer and one-shot techniques, and permit use of higher filler contents. In addition, polyols with narrow molecular weight distributions and low unsaturation offer polyurethanes with improved physical properties. Finally, reducing the level of high molecular weight polyol tail impurities can reduce or eliminate problems with foam collapse.

The following examples merely illustrate the invention. Those skilled in the art will recognize many variations that are within the spirit of the invention and scope of the claims.

EXAMPLE A

Measurement of Alkalinity of Aqueous Zinc Chloride Solutions

The alkalinity of aqueous zinc chloride solutions is measured by potentiometric titration with standardized 0.1N aqueous hydrochloric acid as follows.

Aqueous HCl (about 0.1N) is standardized by potentiometrically titrating accurately weighed samples (about 0.15 g) of dry tris(hydroxymethyl) aminomethane (THAM) in distilled water (80 mL). The endpoint is determined graphically. Normality of the HCl solution=# grams of THAM/ (0.12114× volume of HCl in mL).

Zinc chloride samples are analyzed as follows. A sample is dissolved in distilled water to give an approximately 8.5 wt. % zinc chloride solution. The sample is titrated with standardized 0.1N aqueous HCl solution. The volume of titrant needed to reach the equivalence point is determined graphically.

Alkalinity (expressed as wt. % ZnO) is calculated as follows:

$$\text{Wt.\% ZnO} = (V \times N \times 4.0685 \times 100)/(W \times \% \text{ ZnCl}_2)$$

wherein V is the volume of HCl (in mL) needed to reach the equivalence point, N is the normality of the HCl solution, W is the weight of the zinc chloride sample (in grams), and % $ZnCl_2$ is the weight percentage of zinc chloride in the original sample.

EXAMPLE B

Measurement of Absorbance of the Infrared 642 $cm^{-1}$ Peak of a Zinc Hexacyanocobaltate Catalyst An 8 wt. % solution of zinc hexacyanocobaltate catalyst in potassium bromide powder is introduced into a diffuse reflectometer, where it is scanned in an FTIR having a detector with a working range of at least 550 $cm^{-1}$, according to the following parameters: number of scans=128; resolution=4; undersampling ratio=2; apodization: triangular; zero filling factor: 2.

The solution's Kubelka-Munk spectrum is then calculated using pure KBr powder as the backround spectrum. The height of its 642 $cm^{-1}$ peak is measured, either by hand calculation or through a computer macro that does the following: Draw a tangent line connecting the spectrum's baseline points at 663 and 559 $cm^{-1}$. Draw a second line from the peak maximum at 642 $cm^{-1}$ (plus or minus 4 $cm^{-1}$, the recording resolution) to the tangent line. The length of this second line is measured in, or converted to, units of measured absorbance (A).

Normalized absorbance (A*), i.e., the absorbance corrected for the cobalt content of the zinc hexacyanocobaltate catalyst, is given by:

$$A^* = 100 \times A/8 \times \% \text{ Co}$$

For example, a catalyst that contains 9.0 wt. % cobalt and gives a measured absorbance (A) of 0.26 has a normalized absorbance of:

$$A^* = 100 \times 0.26/8 \times 9.0 = 0.36$$

EXAMPLES 1–7 and COMPARATIVE EXAMPLE 8

Preparation of Zinc Hexacyanocobaltate using Zinc Chloride of Various Alkalinities & Preparation of 8K Mol. Wt. Polyether Diols from the Catalysts The method of U.S. Pat. No. 5,482,908 is generally followed to prepare a zinc hexacyanocobaltate catalyst. Tert-butyl alcohol is the organic complexing agent. The catalyst includes about 20 wt. % of a 1000 mol. wt. polyoxypropylene diol as the polyether component. The alkalinity of the zinc chloride used to make each catalyst is varied as is shown in Table 1 either by using different sources of zinc chloride or by adding zinc oxide to an aqueous zinc chloride solution to adjust alkalinity to the desired value.

Each catalyst is used to prepare an 8000 mol. wt. polyoxypropylene diol as follows: A two-gallon reactor is charged with a 750 mol. wt. polypropylene glycol starter (618 g) and zinc hexacyanocobaltate (0.16 g), and the reactor is purged with dry nitrogen. The stirred mixture is heated to 130° C. under a slight vacuum. Propylene oxide (72 g) is added, and catalyst activation is verified by a rapid pressure drop. Additional propylene oxide (5810 g) is added at 8 g/min. Following addition of the propylene oxide, the mixture is held at 130° C. for 1 h. Residual propylene oxide is stripped from the reactor under vacuum. The polyol product is cooled and discharged. Table 1 shows infrared, unsaturation, and viscosity results for polyols made with each catalyst.

TABLE 1

Effect of Metal Salt Alkalinity[1] Used for Catalyst[2] Preparation on Polyol[3] Properties

| Ex. # | $ZnCl_2$ alkalinity (%) | Normalized infrared absorbance[4] at 642 $cm^{-1}$ (A*) | Polyol unsaturation (meq/g) | Polyol viscosity (cps) |
|---|---|---|---|---|
| 1 | 0.27 | 0.27 | 0.0057 | 3400 |
| 2 | 0.45 | 0.46 | 0.0051 | 3240 |
| 3 | 0.45 | — | 0.0050 | 3420 |
| 4 | 0.55 | — | 0.0046 | 3600 |
| 5 | 0.50 | — | 0.0051 | 3370 |
| 6 | 0.69 | — | 0.0041 | 3380 |

TABLE 1-continued

Effect of Metal Salt Alkalinity[1] Used for Catalyst[2] Preparation on Polyol[3] Properties

| Ex. # | $ZnCl_2$ alkalinity (%) | Normalized infrared absorbance[4] at 642 cm$^{-1}$ (A*) | Polyol unsaturation (meq/g) | Polyol viscosity (cps) |
|---|---|---|---|---|
| 7 | 1.13 | 0.62 | 0.0053 | 4790 |
| C8 | 0.0 | <0.1 | 0.016 | 4100 |

[1] Alkalinity of zinc chloride is measured as described in Example A.
[2] Zinc hexacyanocobaltate-tert-butyl alcohol-1K polypropylene glycol complex prepared as described in the examples.
[3] 8000 mol. wt. polyoxypropylene diol (see examples).
[4] Absorbance as measured in Example B and normalized to correct for differences in cobalt content of the samples.

EXAMPLES 9–10 and COMPARATIVE EXAMPLE 11

Preparation of Zinc Hexacyanocobaltate using Zinc Chloride of Various Alkalinities & Preparation of 8K Mol. Wt. Polyether Diols from the Catalysts A zinc hexacyanocobaltate/tert-butyl alcohol complex catalyst is prepared as follows. A round-bottom flask equipped with mechanical stirrer, addition funnel, and thermometer is charged with distilled water (302 g), potassium hexacyanocobaltate (7.4 g), and tert-butyl alcohol (39 g). The mixture is stirred until all of the potassium salt dissolves. The resulting solution is heated to 30° C. To the stirred solution is added a 50 wt. % aqueous solution of zinc chloride (152 g). The alkalinity of the zinc chloride used to make each catalyst is varied as is shown in Table 2 either by using different sources of zinc chloride or by adding zinc oxide to an aqueous zinc chloride solution to adjust alkalinity to the desired value. Stirring continues for another 30 min. at 30° C. The resulting white suspension is filtered under pressure at 30 psig. An 8.0-g portion of the filter cake is resuspended with vigorous stirring in a solution of tert-butyl alcohol (110 g) and water (60 g). After all of the solids are completely suspended in the wash solution, stirring continues for 30 min. The mixture is filtered as described above. The entire filter cake is resuspended in 99.5% tert-butyl alcohol (144 g), and is isolated as described above. The filter cake is dried at 45° C. overnight under vacuum. The catalyst is used as described in the preceding examples to prepare an 8000 mol. wt. polyoxypropylene diol. Properties of the 8K diols appear in Table 2.

TABLE 2

Effect of Metal Salt Alkalinity[1] Used for Catalyst[2] Preparation on Polyol[3] Properties

| Ex. # | $ZnCl_2$ alkalinity (%) | Polyol unsaturation (meq/g) | Polyol viscosity (cps) |
|---|---|---|---|
| 9 | 0.64 | 0.005 | 3530 |
| 10 | 0.24 | 0.006 | 3920 |
| C11 | 0.0 | 0.017 | 8100 |

[1] Alkalinity of zinc chloride is measured as described in Example A.
[2] Zinc hexacyanocobaltate-tert-butyl alcohol complex prepared as described in the examples.
[3] 8000 mol. wt. polyoxypropylene diol (see examples).

The preceding examples are meant only as illustrations; the following claims define the scope of the invention.

We claim:

1. A process which comprises reacting aqueous solutions of a metal salt and a metal cyanide salt in the presence of an organic complexing agent in a manner effective to produce a substantially non-crystalline double metal cyanide (DMC) catalyst, wherein the metal salt has an alkalinity within the range of about 0.2 to about 2.0 wt. % as metal oxide based on the amount of metal salt.

2. The process of claim 1 wherein the metal salt is zinc chloride.

3. The process of claim 1 wherein the DMC catalyst is a zinc hexacyanocobaltate.

4. The process of claim 1 wherein the organic complexing agent is tert-butyl alcohol.

5. The process of claim 1 wherein the catalyst includes from about 2 to about 80 wt. % of a functionalized polymer.

6. The process of claim 5 wherein the functionalized polymer is a polyether polyol.

7. The process of claim 1 wherein the metal salt has an alkalinity within the range of about 0.3 to about 1.0 wt. % as metal oxide based on the amount of metal salt.

8. The process of claim 1 wherein the metal salt has an alkalinity within the range of about 0.4 to about 0.9 wt. % as metal oxide based on the amount of metal salt.

9. A double metal cyanide catalyst made by the process of claim 1.

10. The catalyst of claim 9 having a normalized infrared absorbance at about 640 to about 645 cm$^{-1}$ within the range of about 0.2 to about 2.

11. The catalyst of claim 9 having a normalized infrared absorbance at about 640 to about 645 cm$^{-1}$ within the range of about 0.3 to about 0.8.

12. A process which comprises reacting aqueous solutions of a metal salt and a metal cyanide salt in the presence of an organic complexing agent in a manner effective to produce a substantially non-crystalline double metal cyanide (DMC) catalyst, wherein the catalyst has a normalized infrared absorbance at about 640 to about 645 cm$^{-1}$ within the range of about 0.2 to about 2.

13. A process which comprises:
    (a) preparing an aqueous solution of a metal salt;
    (b) adjusting the alkalinity of the aqueous solution to a value within the range of about 0.2 to about 2.0 wt. % as metal oxide; and
    (c) reacting the adjusted solution with a solution of aqueous metal cyanide salt in the presence of an organic complexing agent to in a manner effective to produce a substantially non-crystalline double metal cyanide (DMC) catalyst.

14. The process of claim 13 wherein alkalinity is adjusted by adding a base to the aqueous solution in step (b).

15. A process which comprises reacting aqueous solutions of zinc chloride and an alkali metal hexacyanocobaltate salt in the presence of t-butyl alcohol in a manner effective to produce a substantially non-crystalline double metal cyanide (DMC) catalyst, wherein the zinc chloride has an alkalinity within the range of about 0.2 to about 2.0 wt. % as zinc oxide based on the amount of zinc chloride.

16. The process of claim 15 wherein the catalyst includes from about 2 to about 80 wt. % of a functionalized polymer.

17. The process of claim 15 wherein the zinc chloride has an alkalinity within the range of about 0.3 to about 1.0 wt. % as zinc oxide based on the amount of zinc chloride.

18. A zinc hexacyanocobaltate catalyst made by the process of claim 15.

19. The catalyst of claim 18 having a normalized infrared absorbance at about 640 to about 645 cm$^{-1}$ within the range of about 0.2 to about 2.

20. The catalyst of claim 18 having a normalized infrared absorbance at about 640 to about 645 cm$^{-1}$ within the range of about 0.3 to about 0.8.

21. A process which comprises using a metal salt having an alkalinity within the range of about 0.3 to about 1.0 wt. % as metal oxide based on the amount of metal salt to prepare a substantially non-crystalline double metal cyanide catalyst.

* * * * *